G. L. BLANCHARD.
SAW AND SAW CYLINDER FOR LINTERS AND COTTON GINS.
APPLICATION FILED JAN. 22, 1915.
1,161,830.
Patented Nov. 30, 1915.
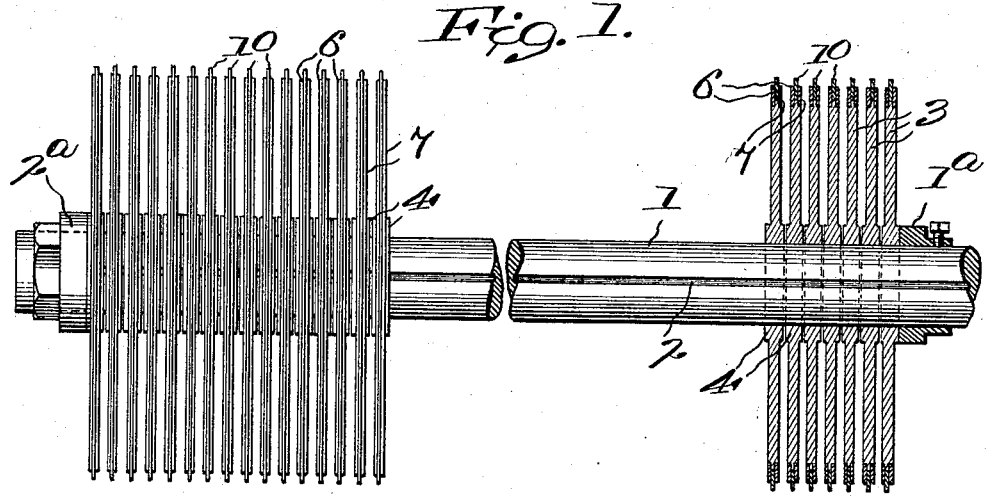
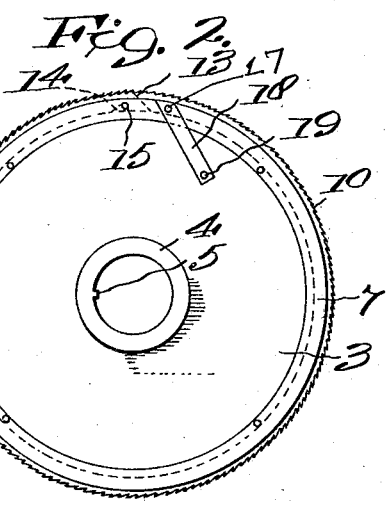
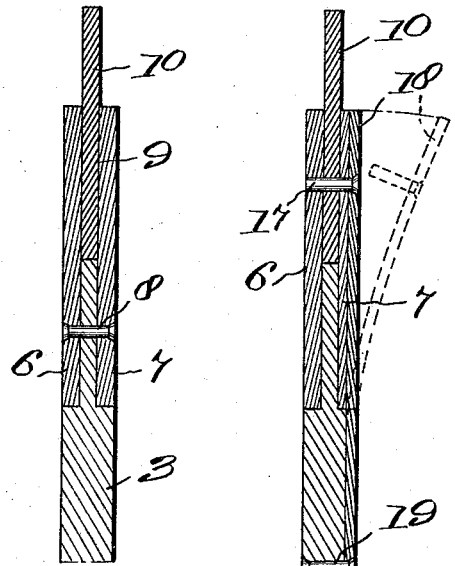
Witnesses
Edwin J Beller.
N. H. Byrd
Inventor
George L. Blanchard.
By
Wilkinson, Guista & Mackay
Attorneys.

UNITED STATES PATENT OFFICE.

GEORGE L. BLANCHARD, OF MONTGOMERY, ALABAMA.

SAW AND SAW-CYLINDER FOR LINTERS AND COTTON-GINS.

1,161,830.  Specification of Letters Patent.  Patented Nov. 30, 1915.

Application filed January 22, 1915. Serial No. 3,796.

*To all whom it may concern:*

Be it known that I, GEORGE L. BLANCHARD, a citizen of the United States, residing at Montgomery, in the county of Montgomery and State of Alabama, have invented certain new and useful Improvements in Saws and Saw-Cylinders for Linters and Cotton-Gins; and I do hereby declare the following to be a full, clear, and exact description of the invention, such as will enable others skilled in the art to which it appertains to make and use the same.

The present invention relates to saws and saw cylinders for linters, delinters, and cotton gins, and has for its purpose to provide a construction of saw cylinder therefor, wherein the individual saws will have independent axial movement whereby to properly position themselves between the ribs of the grate; and which saws may be easily removed for re-sharpening or replacement.

A further purpose of the invention is to produce a saw cylinder in which each component is separate and distinct in itself, to the end of economy in production and simplicity of structure; and wherein the saw *per se* comprises a single circular strip cut apart transversely at a single place only and detachably mounted on a disk member.

It is further proposed to construct the several saws of the cylinder from the ring sections of a spirally wound strip after that manner disclosed in my co-pending application for U. S. Patent, bearing Serial No. 3982 and dated January 22d, 1915.

With these and other objects in view the invention consists in the novel details of construction and combinations of parts more fully hereinafter disclosed and particularly pointed out in the claims.

Referring to the accompanying drawings forming a part of this application, and in which similar reference symbols indicate corresponding parts in the several views:—

Figure 1 is a longitudinal sectional view showing the construction and manner of assembling the several saws of the saw cylinder; Fig. 2 is an elevational view of one of the saws; Fig. 3 is an enlarged transverse sectional view of a part of one of the saws; Fig. 4 is a view similar to Fig. 3 and showing the manner of securing the saw strip; and Fig. 5 is a detail view illustrating the manner of connecting the ends of the saw strip.

Referring to the construction and arrangement of parts in detail, 1 designates the usual shaft of the saw cylinder, that is formed with an axial groove 2, and 3 designates a plurality of disk members constructed preferably of fiber and mounted to have limited axial movement on the shaft 1, to the end that the respective saws may adjust themselves with relation to the grooves or openings between the ribs of the grate, thus preventing excessive friction between the disk or saw and the grate, with the consequent loss of power as well as injury to the parts, and more especially avoiding the danger of fire from the saw teeth striking the grate. Each of said disk members 3 is formed with a hub 4 equally proportioned to either side of the disk faces, and each hub member has a key 5, that fits within the key-way 2, as illustrated in Figs. 1 and 2. The several saws of the cylinder are collectively held against endwise or axial movement by means of collars or nuts $1^a$ and $2^a$ adjustably fixed on the shaft 1 in any suitable manner.

A pair of ring members 6 and 7 is secured to each disk 3, the faces of said disk being cut away to receive said ring members 6 and 7 flush with its respective side faces (see Figs. 3 and 4). The two ring members of each disk are secured thereto by a plurality of rivets 8, and provide a channelway 9, with the periphery of the disk member, to receive the saw that consists of a circular and split strip 10 formed from a single piece.

Each saw strip 10 has its respective end portions 11 and 12 constructed to provide an overhanging joint 13, thus giving a substantially unbroken saw edge, and the end 11 is formed with a slot 14 adapted to have hook engagement with the pin 15 (see Figs. 2 and 5). The end member 12 is apertured, as at 16, to receive the pin 17 carried by the resilient tongue 18, whose fixed end is attached to the disk member 3, as at 19. The side pieces 6 and 7 are correspondingly apertured to receive the pin 17 of the locking tongue 18, which operates after the manner indicated in Fig. 4, and from which it will be evident that as the overhanging strip end 12 is secured, the overhung end 11 will be fastened in position.

To remove a saw from the saw cylinder, put any suitable wedge, such as a screw-driver, under the spring plate 18, pry out the pin 17 from engagement with the hole 16, slide the saw tangentially a sufficient distance to disengage the slot 14 from the pin 15, and remove the strip. To insert a new strip reverse the operation.

It is obvious that those skilled in the art may vary the details of construction and arrangement of parts without departing from the spirit of my invention, and therefore I do not wish to be limited to such features except as may be required by the claims.

I claim:—

1. In a saw cylinder, the combination of a shaft; and a plurality of disk saws spaced slightly apart and each mounted to have independent axial movement on said shaft, substantially as described.

2. In a saw cylinder, the combination of a shaft; a plurality of disk saws spaced slightly apart and each mounted to have independent axial movement on said shaft; and means holding the collective saws against axial movement, substantially as described.

3. In a saw cylinder, the combination of a shaft; a plurality of disks spaced slightly apart and each mounted on the shaft; and a circular strip saw mounted on each of said disks, substantially as described.

4. In a saw cylinder, the combination of a shaft; a plurality of disks spaced slightly apart and each mounted to have independent axial movement on the shaft; and a circular strip saw mounted on each of said disks, substantially as described.

5. In a saw cylinder, the combination of a shaft; a plurality of disks spaced slightly apart and each mounted to have independent axial movement on the shaft; a circular strip saw mounted on each disk; and means holding the collective saw disks against axial movement, substantially as described.

6. A saw for cotton gins and the like, consisting of a single annular strip of resilient material dentated externally and cut apart transversely at a single place only, and having readily detachable securing means at the abutting ends thereof, whereby said strip may be readily applied to or removed from its support, substantially as described.

7. In a saw for cotton gins and the like, the combination of a disk member and a saw member consisting of a single annular strip of resilient material dentated externally and cut apart transversely at a single place only, and having readily detachable securing means at the abutting ends thereof, whereby said strip may be readily applied to or removed from said disk member, substantially as described.

8. In a saw for cotton gins and the like, the combination of a grooved disk member; a circular and saw strip cut apart transversely at a single place only fitting in the groove and having overhanging ends; and means detachably securing the saw strip at said ends, substantially as described.

9. In a saw for cotton gins and the like, the combination of a grooved disk member; and a circular and split saw strip fitting in said groove, one end of the strip having hook engagement with the disk member, the other end of the strip overhanging said hooked end, and a device securing said overhanging end, substantially as described.

10. In a saw for cotton gins and the like, the combination of a disk member; pieces secured to the sides of said member providing a groove; a circular and split saw strip fitting in said groove, one end of the strip having hook engagement with the disk member, the other end of the strip overhanging said hooked end; and one of said side pieces having a tongue constructed to engage said overhanging end and lock the saw strip to the disk member, substantially as described.

In testimony whereof, I affix my signature, in presence of two witnesses.

GEORGE L. BLANCHARD.

Witnesses:
EDWIN J. BELLER,
R. M. PARKER.

Copies of this patent may be obtained for five cents each, by addressing the "Commissioner of Patents, Washington, D. C."